(12) United States Patent
Hill et al.

(10) Patent No.: US 7,074,450 B1
(45) Date of Patent: Jul. 11, 2006

(54) DEHYDRATED MASH POTATO PRODUCT AND PROCESS

(75) Inventors: Tami Hill, Blackfoot, ID (US); Phil Bates, Idaho Falls, ID (US); Seiji Shiratori, Blackfoot, ID (US); Kern Cooper, Idaho Falls, ID (US); Warren Simon, Idaho Falls, ID (US); Will McArthur, Pocatello, ID (US); Lloyd Rockwood, Blackfoot, ID (US); Doug Davlin, Blackfoot, ID (US); Gary Dunn, Pocatello, ID (US); Marlin Herrick, Blackfoot, ID (US); J. Layne Anderson, Blackfoot, ID (US); Ron Luedeman, Blackfoot, ID (US)

(73) Assignee: Basic American, Inc., San Francisco, CA (US)

( * ) Notice: Subject to any disclaimer, the term of this patent is extended or adjusted under 35 U.S.C. 154(b) by 346 days.

(21) Appl. No.: 10/245,841

(22) Filed: Sep. 17, 2002

(51) Int. Cl.
*A23L 1/2165* (2006.01)

(52) U.S. Cl. ............... 426/464; 426/473; 426/481; 426/516; 426/517; 426/637

(58) Field of Classification Search ............... 426/464, 426/473, 481, 482, 516, 517, 637
See application file for complete search history.

(56) References Cited

U.S. PATENT DOCUMENTS

| | | | |
|---|---|---|---|
| 1,295,162 A | 2/1919 | Heimerdinger | |
| 1,377,172 A | 5/1921 | Allen | |
| 2,119,155 A | 5/1938 | Faitelowitz | |
| 2,190,063 A | 2/1940 | Gano | |
| 2,723,202 A | 11/1955 | Rivoche | |
| 2,980,543 A | 4/1961 | Hale et al. | |
| 3,021,224 A | 2/1962 | Stagmeier | |
| 3,024,823 A | 3/1962 | Hyde et al. | |
| 3,163,546 A | 12/1964 | Pader | |
| 3,275,458 A | 9/1966 | Willard | |
| 3,355,304 A | 11/1967 | Barnes et al. | |
| 3,410,702 A | 11/1968 | Frank | |
| 3,418,142 A | 12/1968 | Willard | |
| 3,459,562 A | 8/1969 | Beck et al. | |
| 3,725,087 A | 4/1973 | Miller et al. | |
| 3,764,716 A | 10/1973 | Rainwater et al. | |
| 3,862,345 A | 1/1975 | Westover et al. | |
| 3,968,260 A | 7/1976 | Shatila et al. | |
| 4,007,286 A | 2/1977 | Ooraikul | |
| 4,107,345 A | 8/1978 | MacDonald et al. | |
| 4,156,744 A | 5/1979 | Kiploks et al. | |
| 4,241,094 A | 12/1980 | O'Neil et al. | |
| 4,293,582 A | 10/1981 | Hamann et al. | |
| 4,517,211 A | 5/1985 | Haraldsson et al. | |
| RE31,982 E | 9/1985 | Beck et al. | |
| 5,292,542 A | 3/1994 | Beck et al. | |
| 5,707,671 A | 1/1998 | Beck et al. | |
| 6,066,353 A | 5/2000 | Martines-Serna Villagran et al. | |
| 6,197,358 B1 | 3/2001 | Bunker | |
| 6,235,333 B1 | 5/2001 | Martines-Serna Villagran et al. | |
| 6,312,747 B1 | 11/2001 | Villagran et al. | |
| 2002/0061354 A1 | 5/2002 | Lin et al. | |

FOREIGN PATENT DOCUMENTS

| | | |
|---|---|---|
| CH | 456 325 | 3/1968 |
| DE | 1 417 487 | 8/1968 |
| DE | 1 417 484 | 10/1968 |
| DE | 2 135 394 | 1/1973 |
| GB | 1129804 | 10/1968 |
| GB | 1186403 | 4/1970 |
| GB | 1186564 | 4/1970 |
| GB | 1 207 486 | 10/1970 |
| GB | 1 293 527 | 10/1972 |
| GB | 2 127 270 A | 4/1984 |
| NL | 7 110 784 | 4/1972 |
| SU | 498 941 | 1/1976 |
| SU | 522 068 | 7/1976 |
| SU | 552 954 | 4/1977 |
| WO | WO 85/03204 | 8/1985 |
| WO | WO 00/57724 | 10/2000 |
| WO | WO 02/07535 | 1/2002 |
| WO | WO 02/07537 | 1/2002 |

*Primary Examiner*—Arthur L. Corbin
(74) *Attorney, Agent, or Firm*—David J. Brezner, Esq.; Dorsey & Whitney LLP (57) ABSTRACT

A method for making a dehydrated mashed potato product by cooking fresh potatoes including defects, ricing the cooked potatoes by urging the same through multiple openings in a ricing barrier to form riced moist potato pieces exiting the ricing barrier separated from potato defects which do not pass through the ricing barrier, reforming (e.g., by extrusion) the riced moist potato pieces by applying pressure to form riced, reformed moist potato pieces, and drying the riced, reformed potato pieces to a moisture content of about 5–10%. A dried mashed potato product comprising dried potato pieces which reconstitute in water at 180° F. under light stirring conditions to a mashed potato product having soft lumps characteristic of fresh mashed potatoes at a concentration of about 10 g to 80 g of soft lumps per 400 g of rehydrated product.

22 Claims, 7 Drawing Sheets

Figure 1: Counter-Rotating Twin Drum Ricer

Figure 2: Co-Rotating Ricer/Former

Figure 3: Fresh Cooked Mashed Potato "Lumps" Stained with Dilute Iodine – 16X Magnification Figure 4: New Mashed Potato Product "Lumps" Stained with Dilute Iodine – 16X Magnification Figure 5: Ground Slice Bits Stained with Dilute Iodine Solution – 16X Magnification Figure 6: Stained Fresh Cooked Mashed Potato Starch Cells Stained with a Dilute Iodine Solution Figure 7: Rehydrated New Product Mashed Potato Starch Cells Stained with a Dilute Iodine Solution – 40X Magnification Figure 8: Rehydrated Granule-Based Mashed Potato Starch Cells Stained with a Dilute Iodine Solution – 40X Magnification Figure 9: Rehydrated Potato Flake Starch Cells Stained with a Dilute Iodine Solution – 40X Magnification Figure 10: RVA Viscosity Comparison

DEHYDRATED MASH POTATO PRODUCT AND PROCESS

BACKGROUND OF THE INVENTION

Dehydrated mashed potatoes have been commercially available for many years. Many of these products are based on either potato flakes or potato granules. Consumers of mashed potatoes prefer the rehydrated (reconstituted) potatoes to include soft potato lumps characteristic of fresh mashed potatoes. However, none of the commercially available products have such soft lumps. In an attempt to duplicate the fresh mashed potato product, potato bits (e.g., crushed dehydrated diced potatoes) have been added to potato flakes or granules or a puree mix. However, mashed potatoes produced from such mixtures include firm, not fully rehydrated, potato chunks rather than the soft lumps. Moreover, the rehydration preparation time is substantially extended to reconstitute the potato pieces.

One method to produce dried potato mash which is not directly based on flakes or granules is proposed in Grufstedt, et al. publication WO 85/03204. It is not believed that this process was ever commercialized. The Grufstedt publication disclosed precooking, cooling and cooking potatoes as performed in producing potato mash powder (potato granules) and potato mash flakes. Then, the product is disintegrated by straining through a screen device or through a perforated plate, followed by drying and comminution. The publication discloses reconstitution in boiling water, which suggests an intolerance for reconstitution based on water temperature. This water temperature intolerance is an undesirable trait for a commercial dehydrated mashed potato product.

SUMMARY OF THE INVENTION

In one embodiment of the present invention, a dehydrated potato product suitable for rehydration into a mashed potato product is made by the following steps:

(a) cooking fresh potatoes including defects, (b) ricing the cooked potatoes by urging the same through multiple openings in a ricing barrier having an upstream and a downstream side to form riced moist potato pieces exiting the ricing barrier downstream side separated from potato defects on the upstream side of said ricing barrier which do not pass therethrough, (c) reforming said riced moist potato pieces by applying pressure to the same to form riced, reformed moist potato pieces, and (d) drying the riced, reformed potato pieces to a moisture content of about 5–10%.

Another embodiment of the invention is a dried mashed potato product comprising dried potato pieces which reconstitute in water at 180° F. under light stirring conditions to a mashed potato product having soft lumps characteristic of fresh mashed potatoes at a concentration of about 10 g to 80 g of soft lumps per 400 g of rehydrated product.

DETAILED DESCRIPTION OF PREFERRED EMBODIMENTS

According to the present invention, peeled fresh potatoes including defects are cooked, riced and reformed prior to drying. Any commercially available potato variety may be used. Such varieties include Russett Burbank, Russet Norkotah, Shepody, Ranger, Umatilla, Alturas, Cal White, Norchip, Norgold, Snowden, Ida Rose, and Cal Rose. Prior to cooking, the potatoes are preferably precooked and cooled and, in some instances, precooked and cooled again. Precooking and cooling prior to cooking is well known in producing potato granules or potato flakes. Such methods are fully disclosed in Talburt and Smith, *Potato Processing* (4$^{th}$ Ed.).

Conventional processing of raw potatoes through the cooking step may be used. Potatoes are typically subjected to a variety of unit operations that may include washing, derocking, peeling, trimming and cutting as disclosed in *Potato Processing*. Thereafter, the potato may be subdivided as by cutting into slabs or other smaller forms such as slices, dices, shreds or strips prior to cooking. In one embodiment, prior to cooking, the potatoes may be precooked such as by blanching which serves to inactivate enzymes, swell the potato cells, soften intercellular bonds and the like as performed in the flake and granule industry, as well as wash out excess free starch and water soluble solids such as sugars and other components that create unfavorable flavors. Suitably, the precooking is performed so that the potato core temperature is on the order of 160° F. The thinner the potato pieces, the shorter the precook time. Suitable precook conditions for potato slabs are from 160° F. to 185° F., preferably 170° F. to 175° F. for 10 to 30 minutes, and more preferably for 15–25 minutes. Thereafter, prior to cooking, the potatoes may be cooled, e.g., using water with an inlet temperature of about 55° F. and an outlet temperature of about 75° F. for a time of 25 minutes or until the core temperature drops to on the order of about 80° F. The cooling step serves to retrograde or harden starch cells, as well as wash out excess free starch and water soluble solids such as sugars and other components that create unfavorable flavors, similar to the precook and cool steps for making flakes or granules. If desired, the potatoes may be cycled through a second precook and precool operation similar to the one set forth above before cooking. This serves the purpose of additionally hardening the starch cells.

After cooling, the potatoes are cooked either in steam or water typically at a temperature of about 195° F. to boiling, typically at a cooking time of 35 to 70 minutes and preferably from 45 to 60 minutes. The potatoes can also be cooked in a pressure vessel at higher temperatures—this would reduce the cook time. This is a somewhat more extensive cook time than is typical for the manufacture of potato granules and serves to fully cook the product without significant additional heat in the process. During cooking. During cooking, the starch cells, when stained with a dilute iodine solution and observed under magnification, preferably are fully swollen to provide a shiny outer coating without flat edges and with minimal free starch. If the potato is overcooked, the cells tend to burst producing free starch. Conversely, if the potatoes are undercooked, the derived potato product will not rehydrate adequately to provide a product which simulates fresh mashed potatoes. An undercooked potato starch cell is more dull in appearance, and has flatter, more jagged surfaces when observed under magnification.

The next stage of the process is ricing of the fresh potato which is preferably mixed with ingredients described below prior to ricing. Such ingredients preferably include lubricants (preferably emulsifiers), and previously dehydrated potato products such as potato flakes, granules, or recycle from the dry product produced in this process. The ingredients will be described after the conditions of ricing.

Ricing as defined herein excludes a step called mashing in the potato industry in which the cooked potato products are forced through a "masher" including elongated openings or slots with a short dimension on the order of ⅜ inch to ½ inch (9.5–12.7 mm), e.g., between parallel round rods yielding a mix of chunks and mash but not removing most of the potato defects from the cooked potatoes. Mashing is described at pages 575–576 and illustrated in FIG. 13.7 of *Potato Processing*. As disclosed, cooking and mashing may be accomplished with a single unit. Specifically, a twin screw cooker with a discharge auger with a mashing plate at the discharge end may be employed. In the present process, the above conventional mashing step can be used prior to the ricing and extrusions described herein.

In contrast, ricing according to the present invention is performed by urging the cooked potatoes through multiple openings in a ricing barrier Equipment employed in the present invention may have one upstream source for feeding the unit, and two separate product discharges. The cooked potato product, mixed with ingredients as described below, is separated in this equipment by size and softness of product. The softer product passes through the openings in the ricing barrier, and is further processed as below, while harder and larger portions of the product are retained outside the barrier. The product retained outside or upstream of the barrier may be incorporated into other potato products, but is expelled from this process. This product (retained outside the barrier) typically includes potato peel, and potato defects such as scab, hollow heart, rot, and the like (as described in *Potato Processing*—Ch. 5). Most defects in the potatoes tend to be retained on the upstream side of the ricing barrier and do not pass through the openings or perforations. The level of waste removed by the ricer is typically in the range of 2% to 10% of the potato mash stream fed to the ricing barrier. This waste level may be impacted by the extent of the peeling operation, the quality of the raw material, and the ricer specifications—e.g. thinner sheet metal will flex more than thicker sheet metal thus resulting in more defects retained on the upstream side of the barrier, and thus increasing losses; further, smaller sized openings, lower opening density (i.e. lower percentage of open area), wider gaps between the two surfaces, or lower pressure holding the two surfaces close together will all increase the waste levels. Typical combined losses from the peeling operation through and the ricing operation are in the range of 15% to 35%. Intuitively, lower waste levels are more desirable, however, a virtually defect free product is one of the goals of the ricing operation (as well as the peeling operation). Whereas a 100% defect free product would have inordinately high losses, an acceptable level of defects is in the range of 22 visually observed defects per 100 g of rehydrated product, more preferably 19 or fewer visually observed defects per 100 g of rehydrated product, and most preferably less than 15 visually observed defects per 100 g of rehydrated product. The waste product from the ricing operation may be recovered in other potato processing operations.

During the ricing step, the pieces which exit the downstream side of the ricing barrier tend to assume the cross-sectional shape of the openings or perforations in the ricing barrier. Thus, if the ricing barrier openings are circular, the potato pieces exiting the downstream side of the openings tend to form into elongated pellet-like shapes having a generally circular cross-section. If desired, the shapes of the openings may be any other configuration such as rectangular, hexagonal, oblong, oval, crescent, or the like. The openings are sized to impede the passage of potato defects but not so small as to require undue pressure to force the potatoes through the openings which might thereby rupture potato cells releasing excessive potato starch. It is preferable that the dimension of the cross-sections of the openings be relatively similar regardless of orientation of the line of measurement. Thus, in contrast to the larger slots of a masher, the shortest and longest dimension of the ricing barrier openings may be substantially the same, and, for the circular openings, are identical and equal (the diameter).

The openings in the ricing barrier are substantially smaller than the mashing slot described above. Thus, the barrier openings have a largest dimension preferably less than 19 mm, more preferably less than 17 mm, 15 mm, 13 mm, 11 mm, 9 mm, 7 mm, 5 mm, 4 mm, 3 mm or 2 mm to retain the potato defects. Preferably, such dimension is within the ranges of about 1 mm to 5 mm. The openings may have a smaller dimension greater than 0.5 mm, 1 mm, 2 mm, 3 mm, or 4 mm to prevent undue pressure drops in forcing the cooking potato through the opening and to permit passage of soft lumps. Suitably, the ricing barrier has a range of total open area of the openings between 25% and 50% and preferably between 30% and 40%.

For efficient continuous operation, it is preferable to continuously or semi-continuously remove the potato defects which remain on the upstream side of a rotating ricing barrier, such as with a scraper blade or wire. Otherwise, it may be necessary to frequently shut down to remove such waste material.

Figure 1:
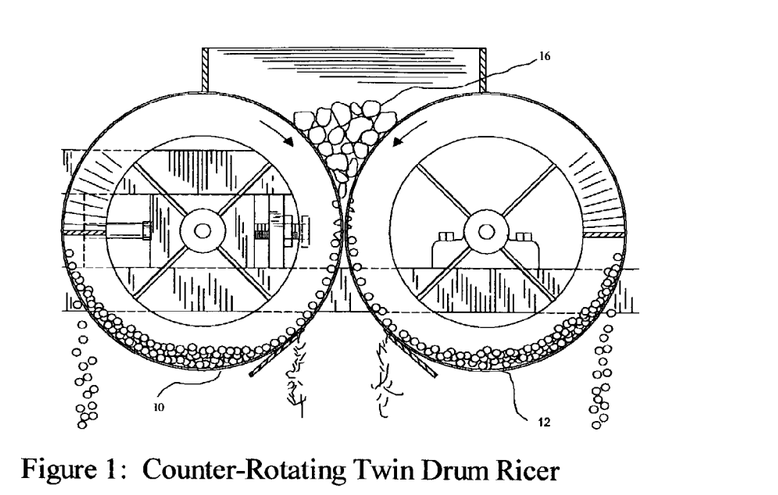
FIGS. 1 and 2 are apparatus suitable for ricing in the present invention.

A suitable apparatus for performing the ricing step is illustrated in Westover, et al. U.S. Pat. No. 3,862,345, FIG. 2. FIG. 1 herein illustrates use of the apparatus in the present invention. Two ricing barriers 10 and 12 in the form of counter-rotating drums or rolls including perforations or openings 14 can be made of sheet metal (e.g., 10 gauge). The two drums 10 and 12 rotating counter-currently with a perforated sheet metal exterior surface. The two drums are positioned close together through a pressurized pneumatic or hydraulic system preferably with stops that prevent them from hitting each other, thus limiting wear, and product contamination. The speed of the drums may be the same, or may be slightly different to control shear. The potato mash to be riced indicated by the number 16 is placed in the nip of the rotating drums 10 and 12 in which they rotate counter-current to each other. As illustrated, drum 10 rotates clockwise and drum 12 rotates counterclockwise. The cooked potato mash at the intersection of the drums is squeezed therebetween to cause most of the potato mash to pass through the openings into the drum interiors. The waste cooked potato product which does not pass through the openings adheres to the outside of the drums and is continuously removed by scraping with a blade or wire. As set forth above, the waste product includes peel and potato defects conventionally found in cooked potatoes including dry rot, scab, hollow heart, fiber and/or hard spots from the precook/cool/cook process. Of particular concern is a defect with a dark coloration such as rot or peel. Spots of rot in potato many times remain intact and do not disintegrate readily as the desired mashed product does. The size of such defects are such as to typically not be able to pass through the openings. Thus, the great majority of the defects remain on the outside of the drums constituting the upstream side of the barrier while the product which passes through the openings into the interior of the drums is recovered separated from most of the defects and peel. Most waste material does not pass through the holes due to hardness and/or size. Product that passes through the holes and into the interior of the drum is subsequently discharged out the end of the drum.

Other forms of ricers may be employed so long as the openings in the barrier are sized to remove the potato defects but not so small as to be impractical in a commercial operation. Moreover, preferably, the potato mash which does not pass through the openings including the defects are continuously or semi-continuously removed from the perforations to prevent undue clogging.

Prior to ricing as described above, it is preferable to mix the cooked potato product with the desired ingredients in a mixer such as a twin shaft paddle or t-bar mixer. A variety of additives known in the industry for incorporation to mash before drying may be employed such as disclosed on pages 576–579 of *Potato Processing* with respect to potato flakes. Similar additives may be used in the present process. One such additive which is particularly advantageous is a lubricant, e.g., a fat and/or emulsifier which can be added to provide lubricity to reduce the shear on the potato cells passing through the ricing barrier. Emulsifiers such as mono- and di-glycerides, (e.g., Dimodan PV manufactured by Danisco USA Inc.) in addition to serving as lubricants also assist in complexing of free starch to aid in the prevention of product stickiness. Thus, it is advantageous to add the lubricants and specifically emulsifiers to the potato mash prior to ricing.

Dried products such as potato flakes or potato granules or recycled dry product from this process can optionally be added to the moist potatoes prior to dehydration, suitably during the mixing prior to ricing. If potato flakes are added, they preferably comprise about 0.25% to 10% by weight of the cooked potato and more preferably 0.5% to 5% and most preferably 1% to 3% by weight of the cooked potato (these percentages include the moisture content naturally contained in the potatoes to which the potato flakes may be added—on a bone dry solids basis, these usage levels correspond to about 1% to 50%, more preferably 2% to 25%, and most preferably 4% to 14%). These products facilitate drying and handling of the moist cooked potato.

Figure 2:
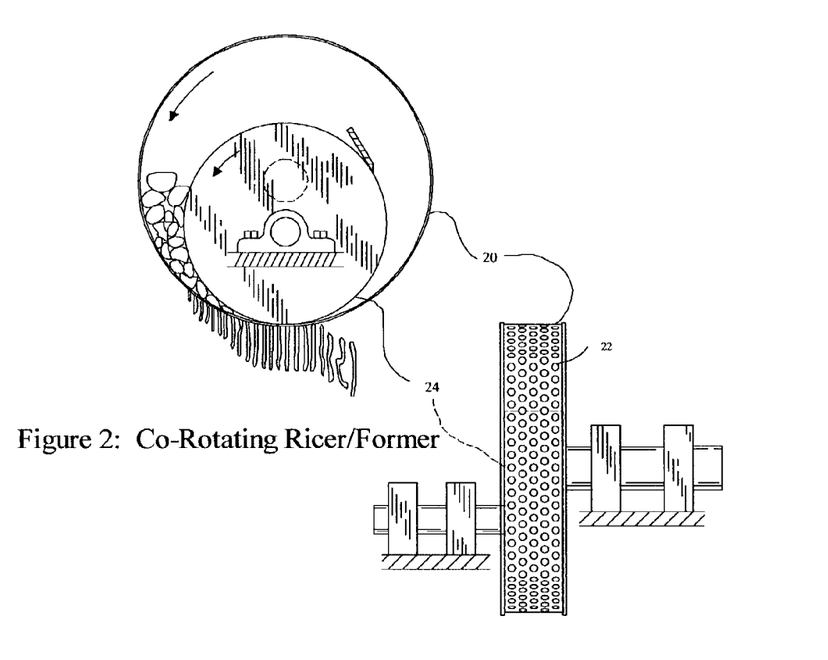

Another form of apparatus suitable for ricing is illustrated in FIG. 2. There, a perforated outer drum 20 including openings 22 rotates with the cooked potato product fed to the interior of the drum. A solid inner drum 24 of smaller diameter and having a solid outer surface rotates eccentrically with drum 20 in the same direction, clockwise or counterclockwise. The cooked potato product is fed to the interior of drum 20 and is squeezed between drums 20 and 24 to form the potato through perforations 22 to form the riced product. Similarly sized openings may be used for embodiments of FIGS. 1 and 2. The drums are close to each other but do not touch, thus limiting wear, and preventing product contamination. The speed of the two drum surfaces at the point of near contact may be the same or slightly different to control shear. Defects may be removed from the cooked potato; the removed defects do not pass through openings 22, while cooked potato with the defects removed does pass through openings 22.

It is preferable to avoid excessive shear during the ricing step. In that regard, low pressure is applied to the potato in passage through the ricing plate openings. The internal, solid surfaced drum provides force to press the product through the holes of the perforated drum. Said force is due to the mass of the drum, and a pressurized hydraulic or pneumatic system which forces the two surfaces close together; suitable pressures are from about 5 to 35 psi, preferably about 10 to 30 psi, more preferably about 15–25 psi.

After ricing, the riced moist potato pieces are reformed by the application of pressure such as by extrusion, e.g., by urging them through multiple openings of a forming barrier to create riced, reformed moist potato pieces which are thereafter dried. Reforming can be executed in a manner similar to the foregoing ricing step. However, one significant difference is that remaining potato defects, which may be present in the cooked potato during reforming, may but need not be separated from the reformed product since most of them are removed during the previous ricing operation. Any defects that are not removed will have passed through a small orifice in the ricer, and be able to pass through the barrier of the reformer without creating significant shear or creating significant blockage. Thus, for example, the reforming step may be performed in a standard extruder, e.g., a twin counter-rotating screw extruder with a faceplate having openings of the desired size. Suitably, the perforations in the faceplate can have an open area varying over a wide range, say from 3% to 40%. A preferable open area is from 5% to 20% to retain structural rigidity of the equipment, while not causing excessive shear damage to the starch cells. The openings in the reforming device may be larger than, the same size as, or smaller than the openings in the ricing device. Preferably, the ricing device openings are similar to or smaller than the forming device openings. If the ricer holes are markedly larger than the forming device openings, the reforming device may block with peel and defects, thus requiring excessive cleaning.

An important advantage of reforming is to produce a dried product which reconstitutes into a fresh mashed potato-like product with a desired amount of soft lumps as described hereinafter. Any pressure application that accomplishes this is encompassed by the term "reforming."

The moist potato pieces exiting from the reforming step tend to be elongated noodle-like shapes that break off typically at about lengths of 5 mm to 60 mm. Such shapes are longer than the riced product described above which are more typically of a length of about 3 mm to 13 mm.

Reforming may also be accomplished by other techniques such as roll forming or sheeting and cutting. For example, a roll former may be used (e.g., shredding and forming equipment manufactured by Wolverine-Proctor). This unit operation consists of two solid drums, one of which is multiply, circumferentially grooved with appropriately sized grooves to form the desired size of product. The two drums are counter-rotating, and run at slightly different speeds such that product deposited in the nip of the drums fills the grooves in the grooved drum. This product is removed by means of a scraper with largely the same profile as the drum surface. The product is released onto a moving belt that has a linear speed approximately the same as the grooved drum surface, thus the strands of product that are formed remain intact. Other techniques may include appropriately designed single screw extrusion or co-rotating twin-screw extrusion, as well as many other means.

After reforming, the product may be dried under conventional conditions. Drying typically occurs in two or more general steps. The initial drying steps bring the product moisture content down to the range of 20% to 45% and more preferably to a range of 25% to 40%. This drying is followed by final drying steps that reduce the product finished moisture content to 5% to 10%, and more preferably 7% to 9%. Suitable conditions are as follows. The initial drying steps can be conducted in a conventional dryer, e.g., a traveling belt Proctor & Schwartz dryer, with dryer air temperatures from about 160° F. to 210° F. for 5 to 20 minutes. Throughout the initial drying steps, the product temperature and relative humidity are kept in a range such that the exhaust air temperature is between about 145° F. and 175° F., and more preferably in the range of 150° F. and 170° F. This is followed by final drying with air temperatures between about 130° F. to 175° F. for 20 to 60 minutes, and exhaust air temperatures are in the range of 110° F. to 150° F.

The moist potato pieces may be transferred onto the dryer traveling belt. It is desirable that this transfer create a porous layer of product that will have even flow of air through the product in the drying operation. One method of distributing the product is by an oscillating conveyor. The conveyor moves in an arc side to side, depositing product on the traveling belt of the dryer. Another effective transfer mechanism is a spinning disk. The product strikes a disk, which is rotating at a rate of about 100 to 400 revolutions per minute. Upon striking the disk, the product is cast onto the moving dryer belt. Various deflectors prior to, after, or as part of the disk may be employed as necessary to evenly distribute the product.

The individual strands of the formed moist potato pieces tend to be in noodle-like configurations similar to the cross-section of the extruder barrier openings. After drying, they retain their noodle-like or rod-like shape in individual or clustered form. The product may then be comminuted (e.g., by milling) to a large dimension size between 3 mm and 40 mm, preferably 7 mm and 20 mm to provide a uniform appearance, density, and allow the product to be packaged. Prior to packaging, additional ingredients may be added to the product. Such ingredients include salt, pepper, fats or oils, flavorings, colorings, and preservatives The product may then be packaged for use as a dehydrated mashed potato.

The product made by the foregoing process has desirable characteristics mimicking fresh mashed potatoes upon reconstitution in hot water. Thus, a mashed potato product reconstituted in water at 180° F. under light stirring conditions includes a quantity of soft lumps in the range of 5 g to 80 g lumps per 400 g of product, more preferably between 15 g and 40 g, more preferably between 25 g and 35 g, and most preferably between 28 g and 32 g. The soft lumps are translucent and very similar to lumps found in fresh mashed potatoes. The lump sizes typically range from about 0.5 mm to 5 mm, preferably from about 1 mm to 3 mm. Size distribution of the lumps in the rehydrated product is similar to fresh mashed potatoes. Specifically, when the product is rehydrated with 180° F. water and lightly stirred, about 2% to 8% by weight, preferably 3% to 6% of the rehydrated mash is retained on a No. 14 screen (openings of 1.4 mm) when lightly washed with water. Also, 5% to 35%, preferably 10% to 30%, more preferably 15% to 23% of the rehydrated mashed potato is retained on a No. 20 screen (openings of 0.85 mm). By comparison, fresh cooked mashed potatoes have a similar lump size distribution. Based on limited testing of the Grufstedt method, the resulting product when rehydrated with 180° F. water (as opposed to the boiling water preparation disclosed by Grufstedt) and lightly stirred, has a lump size distribution that results in 9% to 12% of the rehydrated mashed potato being retained on a No. 14 screen, and 37% to 44% of the rehydrated mashed potato being retained on a No. 20 screen when lightly washed with water. Preferably, the dried potato product includes no dehydrated chunks of the type added from other commercial processes. Thus, the product of the present invention preferably excludes dehydrated chunks from added potato slices, dehydrated potato dices, dehydrated potato shreds, and any product wherein one or more of these is crushed or comminuted in an attempt to mimic the lumps in mashed potatoes. Such prior art for inclusion of chunks or lumps into a mashed potato product typically does not produce the same texture of lumps or the size distribution of lumps.

Figure 3:
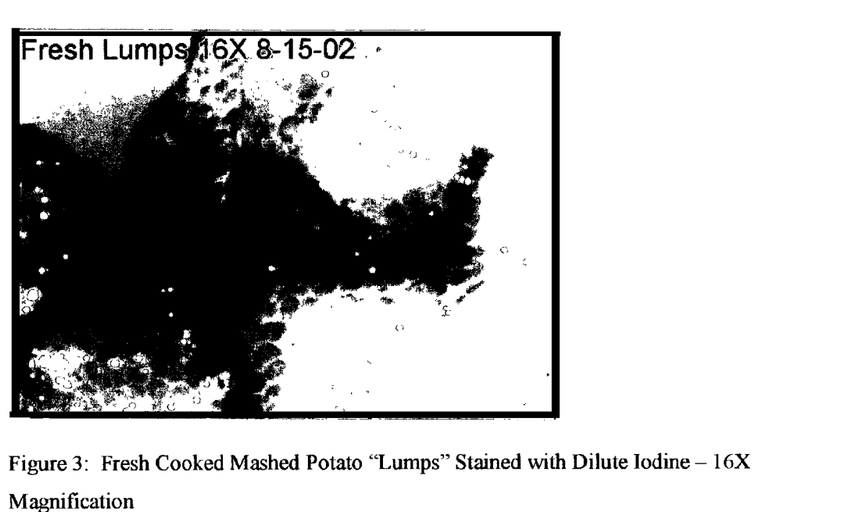
FIGS. 3–9 are photo micrographs comparing the products of the present invention and prior art products.
Figure 4:
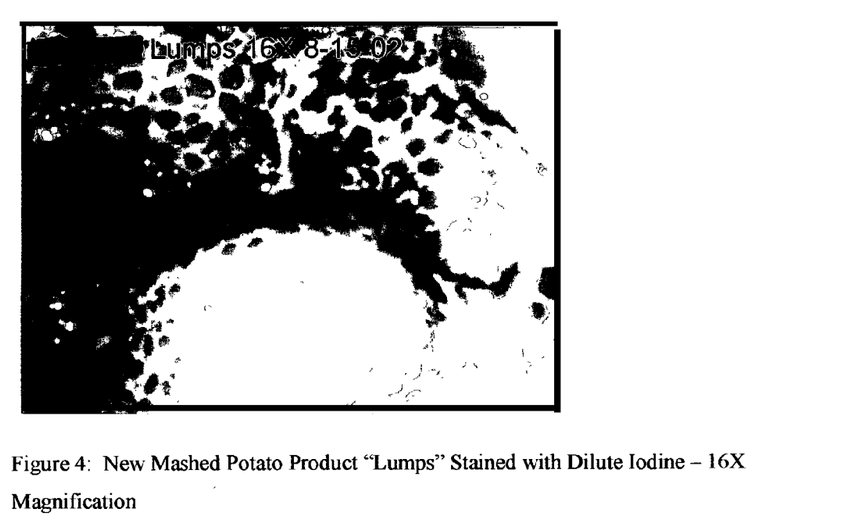
Figure 5:
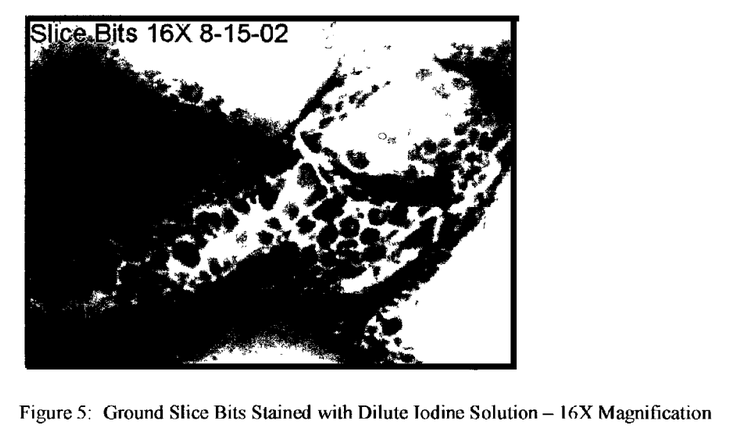
Figure 6:
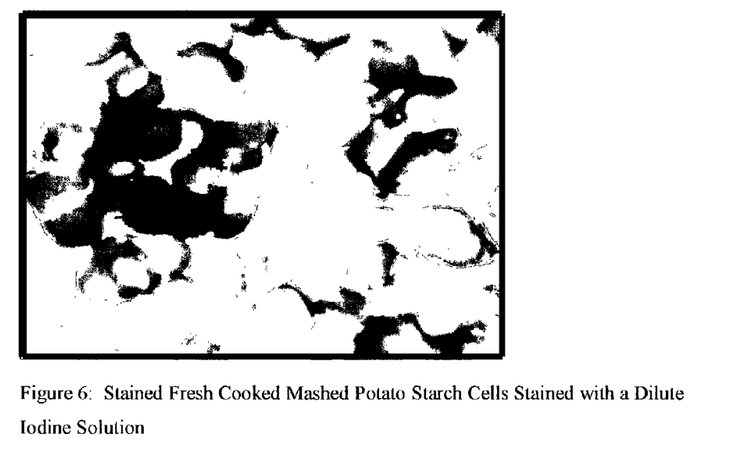
Figure 7:
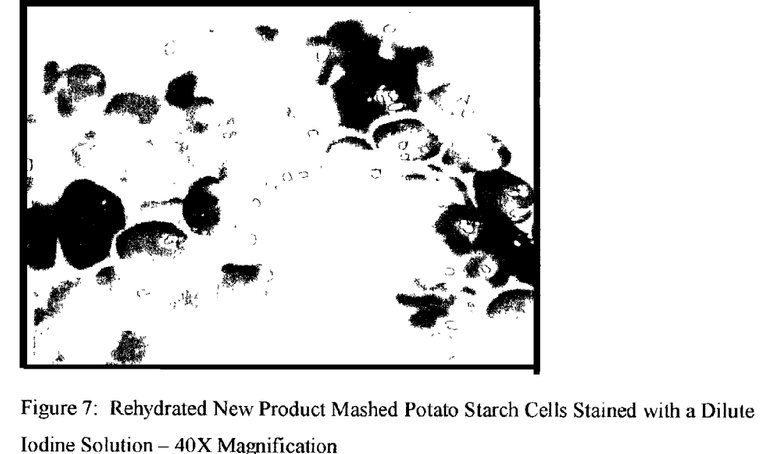
Figure 8:
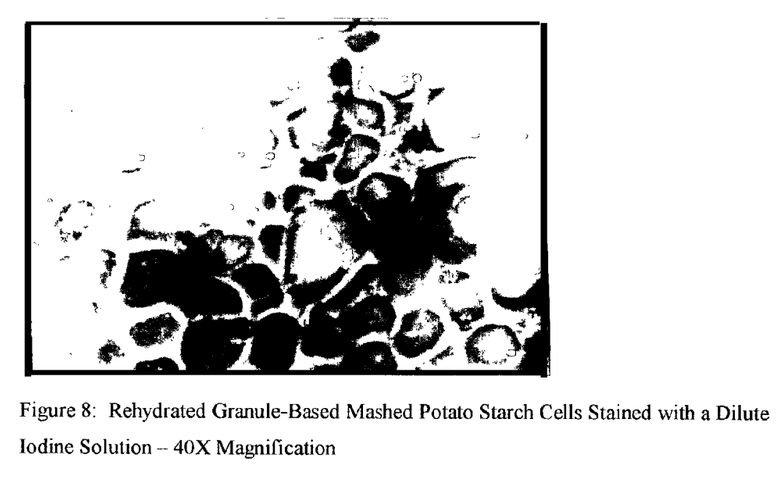
Figure 9:
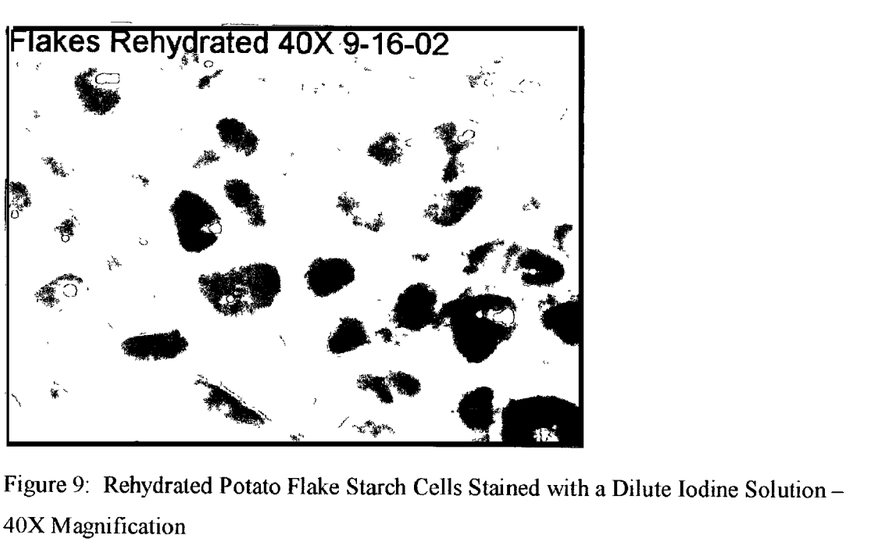

A comparison of lumps from this product, from fresh cooked mashed potatoes, and from added ground slices is shown in FIGS. 3, 4, and 5. As can be seen, the starch cells of the lumps of fresh cooked mashed potatoes (FIG. 3), and of the product of this invention (FIG. 4) are similar in lump size, cell size (within the lumps), and have a surface that appears rough. In contrast, the fabricated lumps formed from potato bits (FIG. 5) have a smoother exterior surface. This smooth exterior surface represents a less than fully rehydrated piece, therefore giving a different mouth feel.

Another advantage of the product of the present invention is its rapid reconstitution in water to a set-up mashed potato product. Thus, at a water temperature of 180° F. under light stirring conditions, the product can set up with soft lumps in less than about 5 minutes.

A further advantage of the product is its wide range of acceptable water temperatures for rehydration. The span of this water temperature range is best seen when compared to other conventional dehydrated mashed potato products. Thus, the dehydrated product has a rehydration water temperature tolerance of 130° F. to boiling, and particularly from 150° F. up to boiling. In comparison, flake-based and granule-based products exhibit a narrow range of water temperature for rehydration. The tolerance of water temperature for rehydration for flake-based products is in the range of about 100° F. to about 170° F. The tolerance of water temperature for rehydration for granule-based products is in the range of about 180° F. to boiling. Thus, the product of this invention spans the water of rehydration temperature tolerance range between flake-based and granule-based products, and overlaps the water of rehydration temperature tolerance portions of both flake-based and granule-based products. This is an important characteristic of the product for foodservice sales because a hot water dispenser is typically available, and the water from these dispensers usually ranges from 160° F. to 200° F.

Another advantage of the product is its rehydration ratio. The rehydration ratio is defined as the quantity of water (by weight) divided by the weight of dry product that the water rehydrates. For example, if 3672 g of water at 180° F. (1 gallon) are used to rehydrate 657 g of product (thus producing a finished weight of 4329 g), the rehydration ratio would be 5.59 (or 5.59:1). Higher rehydration ratios are an advantage in that more water is used for a given amount of finished product. Without additional flavoring and/or ingredients added after the processing, this product has a rehydration ratio in the range of 5.4 to 5.8. In contrast, potato flakes have a rehydration ratio (without additional flavorings and/or ingredients) in the range of 5.0 to 5.4, and granules (without additional flavorings and/or ingredients) have a rehydration ratio in the range of 4.5 to 4.9

Additionally, the product has advantages for mixing tolerance. The product and water can be lightly stirred or machine mixed with favorable results. In comparison to prior art, potato flake based products can be hand mixed, but when machine mixed, they become sticky or gelatinous. On the other hand, granule based products must typically be machine mixed for the best results.

As can be seen by the photomicrographs in FIGS. 6, 7, 8, and 9, the starch cells of this product, when stained with dilute iodine solution, are very similar in size and shape to fresh mashed potato starch cells. In contrast, the granule cells are smaller, and more individualized due to their hard retrogradation. The flake starch cells (FIG. 9) are more broken, as evidenced by the amount of white material between starch cells.

Figure 10:
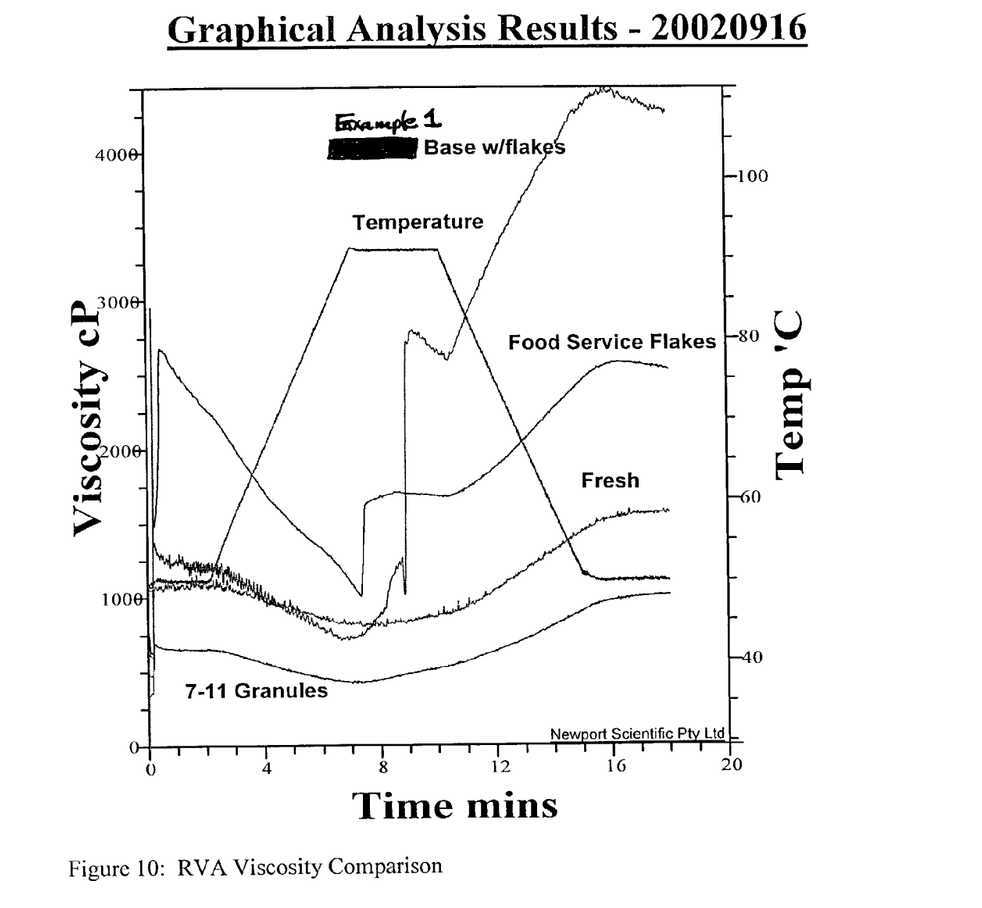
FIG. 10 is a graph comparing viscosities of the reconstituted product with prior art products.

Another characteristic of the product is that the viscosity, as measured by a Foss Food Technologies Rapid Viscosity Analyzer (RVA) is very similar to fresh potatoes. This is shown in FIG. 10, comparing the viscosity of this product (labeled Odyssey), Fresh Mashed Potatoes, Granules and Flakes. The time frame of interest is the first 8 or so minutes of the viscosity measurement—after the first 8 minutes, all of the products tend to begin cooking, and bursting starch cells (this is evidenced by the water jacket temperature indication line). As can be seen, the viscosity of fresh mashed potatoes is much the same as the viscosity of this product. Flakes tend to be more viscous, and granules are less viscous. According to the invention, the viscosity by the RVA test at 5 minutes of measurement with a temperature starting at 50° C. and increasing to 90° C. is within 20% of that of fresh cooked potato, preferably within 15%, more preferably within 10% or 5%.

Another characteristic of the product is that it tends to form a three-layer product during reconstitution under typical conditions. Thus, when the dried potato pieces are mixed with water at 180° F. and stirred in the steam table pan, the pieces will in 10 seconds form 10% to 90% floating rehydrated pieces and 10% to 90% sinking potato pieces with an intermediate water level containing some potato pieces therebetween. This measurement is important because it provides an indication of product reconstitution characteristics. In particular, when all of a product floats, or all of a product sinks, more rigorous mixing is needed to make acceptable product.

In order to illustrate the present invention, examples of its practice are given.

EXAMPLE 1

1. Russet Burbank Potatoes were washed to remove soil and to reduce the microbiological load.
2. Potatoes were then peeled, and cut into 5/8 inch slabs in an Urschel GRL cutter.
3. Pieces were then cooked in saturated steam at atmospheric pressure for 65 minutes.
4. Cooked pieces were mixed with additives including sodium bisulfite, mono- and di-glycerides, salt, titanium dioxide and BHT.
5. The product was then riced in a ricer-peeler consisting of counter-rotating rolls with an outside surface of 18 gauge perforated sheet metal comprised of 3/32 inch holes and hole density constituting 33% open area. The mash was retained on the inside of the rolls and exited the end. The defects were deposited on the outside of the rolls and removed with doctor blades or wires as waste.
6. A reforming step was conducted with a ricer consisting of co-rotating rolls (one large roll with 3/32 inch holes, the other internal to the large roll and solid) to eliminate firm pieces and enhance reconstitution properties.
7. Product was placed on a traveling belt Proctor & Schwartz dryer by an oscillating belt apparatus and dried at the following conditions: 175° F. exhaust temperature for 13 minutes followed by 140° F. exhaust air for 37 minutes. Final product moisture content was 7%–9%.

To the product made by the above process, hot water was added, as were additional ingredients including milk, butter, salt and pepper. The product was then mixed with a wire whisk and was ready to serve at 5 minutes reconstitution time. The taste and texture was similar to fresh cooked mashed potatoes with salt, milk and butter.

EXAMPLE 2

1. Russet Norkotah Potatoes were washed to remove soil and to reduce the microbiological load.
2. Potatoes were then peeled, and cut into 5/8 inch×3/4 inch strips in an Urschel H cutter.
3. Pieces were pre-cooked in water for 16 minutes at 173° F., cooled in 55° F. water for 24 minutes, and cooked in saturated steam at atmospheric pressure for 70 minutes.
4. Cooked pieces were mixed with additives including sodium bisulfite, mono- and di-glycerides, salt, titanium dioxide and BHT, and dehydrated potato flakes.
5. The product was then riced in a ricer-peeler consisting of counter-rotating rolls with 1/8 inch holes. The mash was retained on the inside of the rolls and exited at the end of the rolls. The defects were deposited on the outside of the rolls, removed with doctor blades or wires, and reclaimed in a granule manufacturing process.
6. A reforming step was conducted with a twin-screw extruder with extrusion holes of 3/32 inch diameter to eliminate firm pieces and enhance reconstitution properties.
7. Product was placed on a traveling belt Proctor & Schwartz dryer and dried at the following conditions: inlet air temperatures in the range of 200° F. to 165° F. for 11 minutes followed by temperatures of 165° F. to 135° F. for 40 minutes. Final moisture content was 7%–9%.
8. Product was packaged with a dry flavor mix, which included salt, butter flavor, milk/dairy flavor and fat.

To the product made by the above process, boiling water was added, and briefly stirred. After 5 minutes, it was then machine-mixed for 9 seconds at high speed in a Hobart mixer. The taste and texture was similar to fresh cooked mashed potatoes with salt, milk and butter.

EXAMPLE 3

1. Cal White Potatoes were washed to remove soil and to reduce the microbiological load.
2. Potatoes were then peeled.
3. Whole peeled potatoes were pre-cooked in water for 23 minutes in a steam chamber 14 minutes, followed by cooling with forced air for 10 minutes, and cooked in saturated steam at atmospheric pressure for 50 minutes.
4. Cooked potato pieces were mixed with additives including sodium bisulfite, mono- and di-glycerides, salt, titanium dioxide and BHT, and previously dehydrated potato product from this process.
5. The product was then riced in a ricer-peeler consisting of co-rotating eccentric rolls with 3/32 inch holes. The mash was expressed out of the larger outer drum. The defects were removed from the inside of the outer drum and outside of the inner drum, and reclaimed in a granule manufacturing process.
6. A reforming step was conducted with a roll-former with 1/6 inch grooves to eliminate firm pieces and enhance reconstitution properties.
7. Product was placed on a traveling belt Proctor & Schwartz dryer and dried at the following conditions: inlet air temperatures in the range of 200° F. to 165° F. for 11 minutes followed by temperatures of 165° F. to 135° F. for 40 minutes. Final moisture content was 7%–9%.
8. Product was packaged with a dry flavor mix, which included salt, butter flavor, milk flavor and fat.

To the product made by the above process, boiling water was added, and briefly stirred. After 5 minutes, it was then machine-mixed for 9 seconds at high speed in a Hobart mixer. The taste and texture was similar to fresh cooked mashed potatoes with salt, milk and butter.

EXAMPLE 4

The mashed potato lumps and texture of the lumps was determined by the following testing procedure:
1. The product to be tested is rehydrated with the appropriate water temperature and rehydration ratio
2. 400 g of the product is weighed, and the product is diluted fifty percent with cold water.
3. The resulting dilute product placed on a No. 14 screen (of known weight), and is lightly washed with cold water.
4. The screen and the lumps of the mashed potato product are weighed.
5. The weight of the lumps is this weight less the weight of the screen
6. The lumps are removed from the screen, and a portion thereof is analyzed with a Texture Technologies Corporation Stable Micro Systems—Texture Expert texture analyzer.
7. Hardness of the lumps is determined by the force that the texture analyzer can exert on the product.

When measured with this texture analysis method, the quantity of lumps retained on a No. 20 screen was in the range of 15 to 25 g per 400 g (3.8 to 6.2% per 400 g) of rehydrated product. On a No. 14 screen 16 to 22% per 400 g of rehydrated product is retained as lumps. The lumps retained on the screen were analyzed with a Stable Micro Systems Texture Analyzer, and showed a hardness measured at approximately 4000 g of force by the test using a 1 inch lexan cylindrical, flat bottomed probe with a descending pre-speed of 4 mm/sec, and descending test speed of 1 mm/sec, trigger (record keeping initiation) of 10 g of resistance force. Force was measured in compression. This force is used to compress the product to 70% of the remaining distance after trigger initiation.

Lump hardness by the above test according to the present invention is less than 10,000 g or 8,000 g, 5,000 g or 4,000 g of force.

What is claimed is:

1. A method for making a dried potato product suitable for rehydration into a mashed potato product comprising:
   (a) cooking fresh potatoes including defects,
   (b) ricing the cooked potatoes by urging the same through multiple openings in a ricing barrier having an upstream and a downstream side to form riced moist potato pieces exiting the ricing barrier downstream side separated from potato defects on the upstream side of said ricing barrier which do not pass therethrough,
   (c) reforming said riced moist potato pieces by applying pressure to the same to form riced, reformed moist potato pieces, and
   (d) drying the riced, reformed potato pieces to a rehydratable mashed potato form at a moisture content of about 5–10%, and
   (e) comminuting the dried potato pieces.

2. The method of claim 1 in which the reforming is performed by roll-forming, sheeting and cutting, ricing, or extruding the moist potato pieces.

3. The method of claim 1 in which the reforming is performed by extruding the moist potato pieces through multiple openings in a perforated barrier.

4. The method of claim 1 in which the separated potato defects are continuously removed from said barrier upstream side.

5. The method of claim 1 in which prior to cooking in step (a) the fresh potatoes are precooked and then cooled.

6. The method of claim 1 in which said dried, riced, reformed potato pieces are packaged in a form suitable for rehydration into a mashed potato product.

7. The method of claim 1 further comprising rehydrating the dried, riced, reformed potato to form a mashed potato product.

8. The method of claim 1 performed under conditions at which said dried riced, reformed potato includes rod-like shapes in individual or clustered form.

9. The method of claim 1 in which said cooked potatoes are mixed with an emulsifier prior to said ricing step.

10. The method of claim 1 in which said cooked potatoes are mixed with a lubricant prior to said ricing step.

11. The method of claim 1 in which the openings of said ricing barrier have a smallest dimension between about 1 mm and 5 mm.

12. The method of claim 1 in which said dried potato pieces are reconstitutable with water at 180° F. under light stirring conditions to a mashed potato product having soft lumps characteristic of fresh mashed potatoes at a concentration of about 10 g to 80 g gm of soft lumps per 400 g of product.

13. The method of claim 1 in which said dried potato pieces when mixed with water at 180° F. and lightly stirred in a steam table pan, will, in 10 seconds, form 10–90% floating rehydrated pieces and 10–90% sinking potato pieces.

14. The method of claim 1 in which said comminuted dried potato pieces then packaged.

15. The method of claim 1 in which dehydrated potato flakes, potato granules, or a portion of said dried potato product, or a combination of two or more of them, are added to the cooked potatoes prior to said reforming step.

16. The method of claim 15 in which potato flakes are added.

17. The method of claim 1 in which said potatoes are selected from potato varieties including Russet Burbank, Russet Norkotah, Shepody, Ranger, Umatillas, Alturas, Cal White, Norchip, Atlantic, Snowden, Ida Rose, and Cal Rose.

18. The method of claim 1 in which, prior to cooking, said potatoes are subdivided.

19. The method of claim 1 in which said dried potato pieces have a rehydration ratio (amount of water used to refresh product:amount of dry product) of at least about 4.6.

20. The method of claim 1 in which said dried potato pieces are reconstitutable with water within a wide temperature range encompassing about 130° F. to boiling for rehydration.

21. The method of claim 1 in which said ricing barrier comprises a first drum with perforations adjacent to a second rotating drum and said upstream barrier side comprises the outside of said perforated drum, in which said ricing is performed by pressing the cooked potato between said first and second drums to form said moist potato pieces passing into said first drum.

22. The method of claim 1 in which the ricing or reforming is performed by feeding the cooked fresh potatoes to the interior of a perforated drum and rotating a roller in the perforated drum interior relative to the perforated drum to squeeze the fresh cooked potatoes through the drum perforations.

* * * * *